June 30, 1953  W. H. HENRICH  2,644,128
VOLTAGE REGULATOR
Filed May 9, 1952
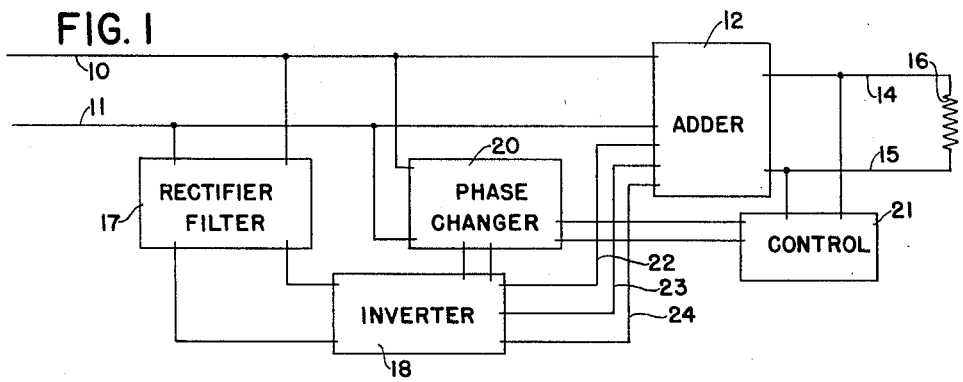
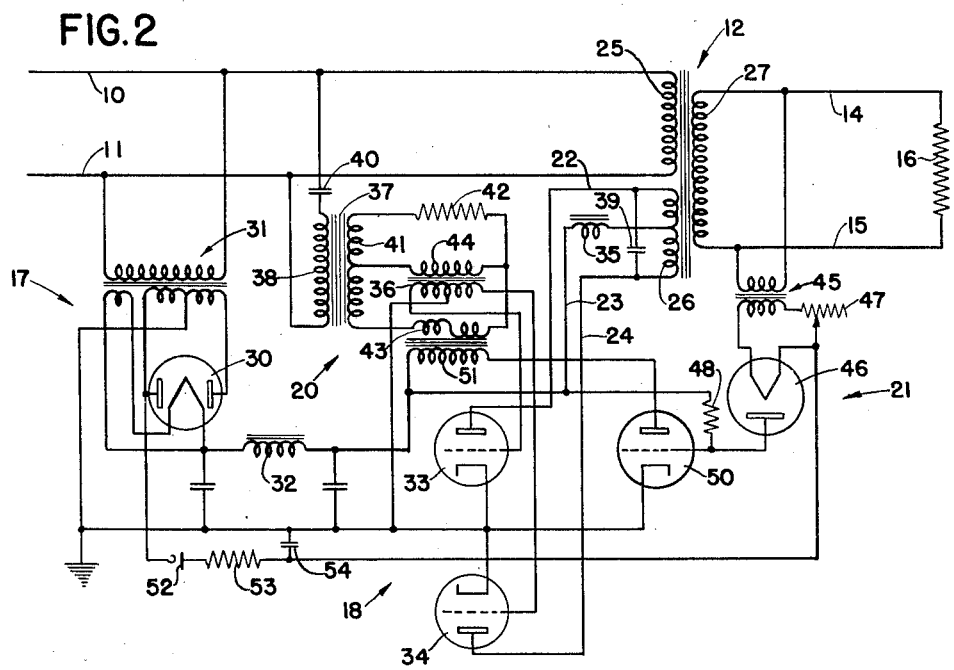
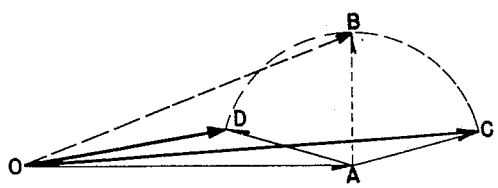
*INVENTOR.*
WILLIAM H. HENRICH
BY Ralph E. Bitner
*ATTORNEY*

Patented June 30, 1953

2,644,128

UNITED STATES PATENT OFFICE 2,644,128

VOLTAGE REGULATOR

William H. Henrich, East Norwalk, Conn., assignor to Sorensen & Company, Inc., Stamford, Conn.

Application May 9, 1952, Serial No. 286,980

8 Claims. (Cl. 323—45)

This invention relates to a voltage regulator for alternating current systems and has particular reference to a circuit which performs voltage regulation of an output circuit by changing the phase of an auxiliary voltage and then adding this voltage to the main power supply in vector relationship.

It has been customary to regulate the voltage of alternating current systems by changing the impedance in series with the supply line. Other forms of voltage regulation comprise the use of an autotransformer in connection with an impedance which can be changed by a sensing arrangement in conjunction with an amplifier system. This changeable impedance generally takes the form of a saturable reactor. One of the disadvantages of this and other prior art systems lies in the series impedance in the main supply line. Such circuits cause a substantial voltage drop and the main source of supply must have a voltage which exceeds the load voltage by a considerable amount. Also, it should be pointed out that prior art systems generally use a circuit arrangement in which all the current used by the load traverses the variable impedance network, thereby requiring circuit components which are capable of passing the entire load current. The present invention uses a circuit which sends a greater proportion of the alternating current supply directly from the supply source to the load. Voltage regulation is accomplished by adding a small voltage to this supply line in vector relationship. This is accomplished by a transformer having two primaries and one secondary and the variation in output voltage is accomplished by changing the phase of the added alternating current power.

One of the objects of this invention is to provide an improved voltage regulator for an alternating current system which avoids one or more of the disadvantages and limitations of prior art arrangements.

Another object of the invention is to regulate the voltage of an alternating current system by adding a comparatively small voltage component in vector relationship.

Another object of the invention is to simplify the regulation system of an alternating current supply line by passing most of the current from the supply to the load without any series impedance.

Another object of the invention is to reduce distortion in a regulated voltage supply.

The invention comprises a transmission line from the power supply to the load traversing an adder component which may be a transformer. A rectifier and filter are connected across the supply line and apply a direct current to an inverter system, the frequency of which is controlled by the frequency of the main supply line. The arrangement also includes a sensing device for determining the voltage across the load terminals and a direct current amplifier circuit between the sensing and a saturable reactor which controls the phase of the alternating current produced by the inverter circuit. The output of the inverter is added to the voltage applied to the load.

For a better understanding of the present invention, together with other and further objects thereof, reference is made to the following description taken in connection with the accompanying drawings.

Fig. 1 is a diagram of connections showing the various components of the regulator system in block representation.

Fig. 2 is a schematic diagram of connections showing the details of all the circuits used in the regulator.

Fig. 3 is a vector diagram illustrating the manner in which a change of phase of an added vector may control the terminal voltage of an alternating current supply.

Referring now to Fig. 1, supply lines 10 and 11 are connected to a source of alternating current (not shown) which may vary considerably in voltage output. These conductors are connected to an adder 12 which has output conductors 14 and 15 connected to a load 16. Conductors 10 and 11 are also connected to the input circuit of a rectifier and filter circuit 17. The output of this unit is connected to an inverter system 18 which transforms the direct current to alternating current of the same frequency as the power delivered by conductors 10 and 11. For the required frequency and phase control a phase changer circuit 20 is employed. Circuit 20 receives its power from the supply conductors 10 and 11 and its phase is determined by a control circuit 21 coupled to the load conductors 14 and 15. The phase-changer circuit is connected to the inverter circuit to control the phase of the output conductors 22, 23, and 24 which are connected to the adder circuit.

Referring now to Fig. 2, the details of one form of this circuit will be disclosed. The adder 12 includes two primary windings 25 and 26 and a single secondary winding 27 on a transformer core. This arrangement constitutes an adder system which adds the currents in the two primary windings and produces a voltage on the secondary conductors 14 and 15 which is proportional to the vector sum of the voltages applied to the input conductors.

The rectifier filter circuit 17 includes a double diode rectifier tube 30, a power transformer 31 of conventional design and a filter circuit containing capacitors across the output conductors and a filter choke 32 in series with the positive line.

The inverter circuit 18 includes two triodes 33 and 34 with their cathodes connected together and joined to the direct current negative supply conductor. The anodes of the triodes are connected to conductors 22 and 24, respectively, which are connected to the end points of primary winding 26. The anodes receive their high voltage supply through conductor 23 which is in series with a reactance 35 and is connected to the positive supply conductor from the filter-rectifier circuit. The control electrodes of triodes 33 and 34 are connected to the end points of a transformer secondary 36, the primary winding of which is part of the phase changing circuit.

The phase changing circuit 20 includes a supply transformer 37 which has its primary winding 38 connected across the supply conductors 10 and 11. A large adjustable capacitor 40 may be placed in series with one of the input lines to correct for a change of phase due to the transformer windings but this is usually not necessary. The end terminals of secondary winding 41 are respectively connected to a resistor 42 and a saturable reactor 43. The mid-point of secondary winding 41 is connected to the primary winding 44 of the transformer which contains the secondary winding 36. The other terminal of winding 44 is connected to the resistor 42 and the alternating current winding 43 of the saturable core reactor. If the impedances of resistor 42 and reactor winding 43 are equal, the phase of the voltage across winding 44 is 90° from the voltage across secondary winding 41. If the impedance of reactance 43 is made quite small in relation to the impedance of resistor 42, the voltage across winding 44 is close to the phase of the lower end of winding 41, and if the reverse is true the voltage of winding 44 approximates the phase of the upper end of winding 41. Saturable reactors have a range of reactance of at least 10 to 1 and are controlled by the amount of direct current in a control winding. With the circuit shown in Fig. 2, a phase variation of 160° is possible.

The control circuit 21 includes a connection to the output leads 14, 15 to sense the value of the load voltage. A transformer 45, usually step-down, is employed to apply the desired range of voltages to the filament of a diode 46. An adjustable resistor 47 in the filament circuit permits a variation of regulated voltages at the load terminals. The anode of diode 46 receives its power supply through resistor 48 and the output line from rectifier circuit 17. The anode of diode 46 is also connected to the control electrode of a direct current amplifier tube 50. This tube, which is generally a triode, has its anode connected directly to one terminal of the direct current winding 51 on the saturable reactor. In order to bias the control electrode of amplifier tube 50 at a useful value the filamentary cathode of diode 46 is given a potential which is considerably more negative than ground. This voltage is obtained from one side of the secondary winding of transformer 31 and is rectified by a single rectifier unit 52. A resistor 53 and capacitor 54 filter the supply.

During the operation of the circuit when the supply voltage and load current are at or near their average values, the filament in diode 46 is heated to a temperature which allows a median value of current to flow from its anode and thereby control amplifier tube 50 to pass an average current through its anode and the direct current winding 51 of the saturable reactor. The result is a voltage from winding 36 which is applied to the control electrodes of inverter tubes 33 and 34 to produce an alternating voltage across winding 26 which is 90 degrees out of phase with the main supply voltage across winding 25. The currents in windings 25 and 26 are added, in vector relationship, by transformer 12; the result appearing in the secondary winding 27.

Figure 3 illustrates the vector addition of the voltages in transformer 12. Let the vector OA represent the voltage of the alternating current supply and the vector AB, the added voltage due to winding 26. Then the resultant voltage is represented, in magnitude and phase, by the dashed line OB.

Now, let it be assumed that the adjustable resistor 47 is increased a small amount to lower the current and temperature of the filament of diode 46; less current flows through the anode circuit, and the control electrode of tube 50 is increased in voltage to send a larger current through the direct current winding 51 and reduce the reactance of winding 43 because of core saturation. This change in reactance alters the phase of the current in winding 44 and the voltage applied to the control electrodes bears a similar phase shift. The resultant voltage across primary winding 26 is indicated by the vector AC in Fig. 3 and the sum of this and the main supply is shown as OC.

A change in the resistor 47 to increase the current in the filament of diode 46 produces results of an opposite nature to those described above and shifts the phase of the added voltage to AD resulting in a load voltage indicated by the vector OD.

The above description assumed that the supply voltage and the load impedance remained constant while the filament resistor 47 was varied. It will be obvious from the above described operation, that the circuit is self regulating and as long as the resistor 47 is kept at a desired setting the terminal voltage across the load 16 will be maintained within a very narrow range of voltage variations.

It is a well known fact that all circuits using saturable reactors cause some distortion of wave form. This is true of the present circuit but it will be evident that the distortion is present only in the added current present in winding 26. The main voltage supply to winding 25 is independent of any saturable circuit effects and hence the output voltage applied to load 16 has a wave form which more closely resembles the wave form of the applied voltage than other well known forms of A. C. voltage regulators.

Tubes 33 and 34 may be high vacuum triodes in which case inductor 35 and capacitor 39 are not necessary. If tubes 33 and 34 are gas-filled thyratrons components 35 and 39 are necessary for the proper operation of the circuit.

All the amplifier tubes 33, 34, and 50 may be replaced by transitor elements provided appropriate changes are made in the operating voltage and the input and output impedances.

While there have been described and illustrated

I claim:

1. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; a phase changing circuit connected between the alternating current supply and a control circuit in the inverter system for controlling the frequency and varying the phase of the inverter power output; and a control circuit connected between the load and the phase changing circuit which changes the phase of the inverter output in response to changes in the voltage of the load.

2. A voltage regulator for an alternating current supply system comprising; a transformer having a first and second primary winding and a secondary winding, said first primary winding connected to the alternating current supply and said secondary winding connected to a load; a rectifier filter connected to said supply for providing a source of direct current power; an inverter system connected to the source of direct current for providing alternating current power which is connected to the second primary winding; said inverter system incuding one or more variable impedance units capable of being controlled by an external circuit; a phase changing circuit connected between the alternating current supply and the variable impedance units in the inverter system for controlling the frequency and varying the phase of the inverter power output; and a control circuit connected between the load and the phase changing circuit which changes the phase of the inverted output in response to changes in the voltage of the load.

3. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; said inverter system including two electron discharge devices, each having a cathode, an anode, and a control electrode; a phase changing circuit connected between the alternating current supply and the control electrodes in the inverter system for controlling the frequency and varying the phase of the inverter power output; and a control circuit connected between the load and the phase changing circuit which changes the phase of the inverter output in response to changes in the voltage of the load.

4. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; said inverter system including two electron discharge devices, each having a cathode, an anode, and a control electrode; a phase changing circuit connected between the alternating current supply and the control electrodes in the inverter system for controlling the frequency and varying the phase of the inverter power output; and a control circuit connected to the load for sensing voltage changes therefor, said control circuit also connected to the phase changing circuit and adapted to change the phase of the inverter circuit to produce an increase in voltage across the secondary winding when the voltage across the load drops.

5. A voltage regulator for an alternating current supply system comprising; a transformer having a first and secondary primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; said inverter system including two electron discharge devices, each having a cathode, an anode, and a control electrode; a phase changing circuit connected between the alternating current supply and the control electrodes in the inverter system for controlling the frequency and varying the phase of the inverter power output; and a control circuit connected to the load for sensing voltage changes therefor, said control circuit also connected to the phase changing circuit to decrease the phase of the inverter output with respect to the alternating current supply when the voltage of the load decreases.

6. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; said inverter system including two electron discharge devices, each having a cathode, an anode, and a control electrode; a phase changing circuit connected between the alternating current supply and the control electrodes in the inverter system for controlling the frequency and varying the phase of the inverter power output; and a control circuit for varying the phase of the inverter output, said control circuit including, a diode having a filament connected to the load, and circuit means for applying the output of said diode to the phase changing system to alter the phase of the inverter output applied to the second primary winding of the transformer.

7. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alterating current power which is connected to the second primary winding; said inverter system including two electron discharge devices, each having a cathode, an anode, and a control electrode; a phase changing circuit connected between the alternating current supply and the control electrodes in the inverter system for controlling the frequency and varying the phase of the inverter power output; and a control circuit for varying the phase of the inverter output by changing the reactance of the phase changing circuit, said control circuit including a diode having a filament connected to the load, an amplifier system for amplifying values of anode current in the diode, and means for applying the output of said amplifier to the phase changing system to control the phase in relation to the alternating current supply.

3. A voltage regulator for an alternating current supply system comprising; a transformer having a first and second primary winding and a secondary winding, said first primary winding connected to the alternating current supply and said secondary winding connected to a load; a rectifier filter circuit connected to said supply for providing a source of direct current power; an inverter system connected to the source of direct current for providing alternating current power which is connected to the second primary winding; said inverter system including two electron discharge devices, each having a cathode, an anode, and a control electrode; a phase changing circuit connected to the alternating current supply and including a saturable reactor, the reactance of which is controlled by the current in a direct current winding; a circuit means for applying the output of the phase changing system to the control electrodes of said inverter for controlling the frequency and varying the phase of the inverter power output; and a control circuit connected between the load and the phase changing circuit which changes the phase of the inverter output to maintain the load voltage within a desired range of values.

WILLIAM H. HENRICH.

No references cited.